United States Patent [19]

Eisenmann

[11] 4,357,220
[45] Nov. 2, 1982

[54] METHOD AND APPARATUS FOR RECOVERING CHARGED IONS FROM SOLUTION

[76] Inventor: John L. Eisenmann, 13 Accord Pond Dr., Hingham, Mass. 02043

[21] Appl. No.: 117,620

[22] Filed: Feb. 1, 1980

[51] Int. Cl.³ .................... B01D 13/02; B01D 57/02; C25B 15/08
[52] U.S. Cl. ................ 204/180 R; 204/237; 204/299 R; 204/DIG. 13; 210/651
[58] Field of Search ............... 204/180 P, 180 R, 151, 204/237, 301, 299 R, DIG. 13; 210/22 R, 644, 649, 651

[56] References Cited

U.S. PATENT DOCUMENTS

| 3,454,490 | 7/1969 | Wallace | 210/22 R |
|---|---|---|---|
| 3,674,669 | 7/1972 | Tuwiner | 204/301 X |
| 3,766,049 | 10/1973 | Smith | 204/180 P X |
| 3,806,436 | 4/1974 | Tuwiner | 204/180 P |
| 3,909,381 | 9/1975 | Ehrsam | 204/180 P |
| 3,926,759 | 12/1975 | Horn et al. | 204/180 P |
| 4,229,280 | 10/1980 | Horn | 204/180 P X |

FOREIGN PATENT DOCUMENTS 2537591  2/1977 Fed. Rep. of Germany.
2756574  6/1978 Fed. Rep. of Germany ... 204/DIG. 13
1298814 12/1972 United Kingdom.

OTHER PUBLICATIONS

Kelley et al., "Metal Ion Recovery From Aqueous Industrial Wastes", *Dupont Innovation*, vol. 4, #2, Winter 1973.
Donnan Dialysis System for Metals Recovery Using Nafion ® Mass Exchangers.

*Primary Examiner*—Donald R. Valentine

[57] ABSTRACT

An apparatus and method for removing charged ions from solution by treating the solution with electrodialysis followed by Donnan dialysis. One of many applications is for treating the baths associated with the metal finishing, e.g. plating, anodizing, or etching, industry. For example, charged ions can be removed from the rinse baths of a plating line by treating the rinse water of a first rinse bath following the plating bath with an electrodialysis unit and returning the concentrated solution to the plating bath, and treating a second rinse bath following the first rinse bath with a Donnan dialysis unit to produce an additional concentrated solution and a diluted effluent which may be either discharged into a sewer or stream, or readily destroyed.

8 Claims, 1 Drawing Figure

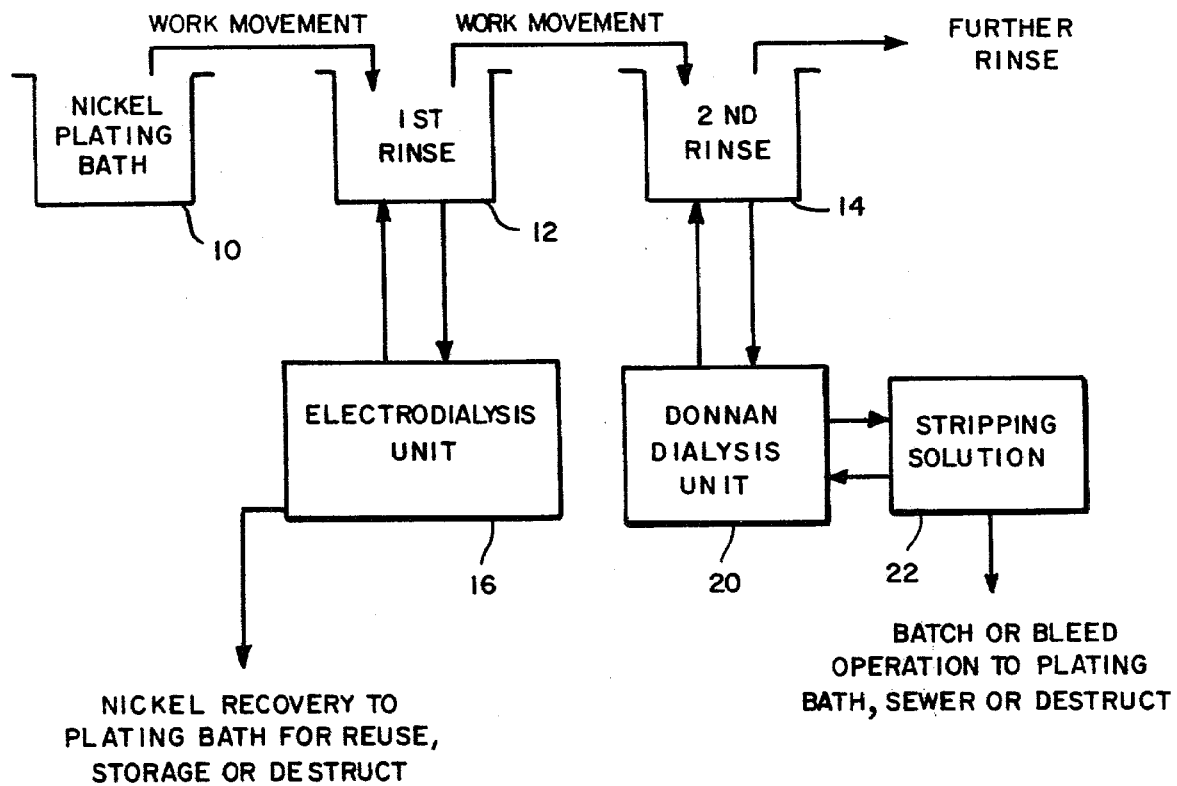

METHOD AND APPARATUS FOR RECOVERING CHARGED IONS FROM SOLUTION

BACKGROUND OF THE INVENTION

1. Field of the Invention

This invention relates to apparatus for recovering charged ions from solution and, more particularly, to apparatus for recovering such charged ions through a combination of electrodialysis and Donnan dialysis.

2. Description of the Prior Art

Various types of apparatus have been used in the past for separating and recovering charged ions from solution, such as the removal of plating metals from plating rinses. Some of the techniques, such as reverse osmosis, remove a large proportion of the metals from the rinsing baths. However reverse osmosis suffers from the disadvantage that the resulting solution containing the metal is at an insufficient concentration to be returned directly to the plating bath. Furthermore, since contaminating by-products as well as the charged ions are recovered, the plating bath may be poisoned by any attempt to reuse the recovered material.

Two processes which have recently been suggested for use in recovering charged ions from metal plating rinses are electrodialysis and Donnan dialysis. For example, U.S. Pat. No. 3,766,049 issued on Oct. 16, 1973, U.S. Pat. No. 3,909,381 issued Sept. 30, 1975, and U.S. Pat. No. 3,926,759, all incorporated herein by reference, describe recovery of metals from rinse solutions by the use of electrodialysis.

Furthermore it is known to separate charged ions by Donnan dialysis as described in U.S. Pat. No. 3,454,490, issued July 8, 1969, incorporated herein by reference. An article appearing in *Dupont Innovation*, vol. 4, no. 2, Winter 1973, pages 4-7 entitled "Metal Ion Recovery From Aqueous Industrial Wastes" describes the use of Donnan dialysis in several applications and furthermore suggests the use of such a system for the recovery of copper, nickel, cadmium, and chromium from electroplating wastes.

While each of these processes have been suggested for metal recovery, they have been discussed as alternatives to each other and each has disadvantages which have resulted in only a limited acceptance by the plating industry. Both electrodialysis and Donnan dialysis are based on the use of ion-exchange membranes which selectively pass ions of either positive or negative charge. In electrodialysis, the concentration of charged ions is usually conducted in an apparatus comprising an array of compartments arranged for parallel fluid flow partitioned by ion selective membranes. The membranes are arranged in a sequence, alternating between cation permeable and anion permeable membranes. A solution containing the charged ions to be recovered (the feed solution) is passed through the compartments in contact with the membranes and an electrical potential is applied across the system by means of electrodes contained in compartments at each end of a membrane stack. Under the influence of the electrical potential anions are forced in one direction through the anion permeable membrane while cations are simultaneously forced through the cation permeable membranes in the other direction, thus concentrating the charged ions in alternate compartments and diluting them in adjacent ones. On the other hand, Donnan dialysis employs only one type of ion-exchange membrane, a number of which may be arranged in a stack similar to the electrodialysis stack. In this case, the solution to be treated is introduced into alternating compartments and the adjacent compartments are fed a special stripping solution. The process acts to replace either the anions or cations in the feed solution (depending on the type of ion exchange membrane used) with the replacement anion or cation being supplied by the stripping solution. The driving force is the concentration difference between the similarly charged ions in the feed and stripping solutions and the process acts to replace the feed solution ions, in contrast to electrodialysis which removes the feed solution ions.

When recovering ions from rinsing baths, such as recirculating, dead, or reclaim solutions, it is preferred that the resulting solution of recovered ions be immediately returnable to the plating bath, and that the rinse solution be maintained at such a small remaining amount of dissolved ions that it can be either directly discharged into a stream or sewer, or in the alternative can be readily destroyed either directly or with minimum further treatment. Electrodialysis is most efficient at higher concentrations of metal per liter of solution. In fact, electrodialysis works reasonably well until a metal ion concentration of less than 250 ppm is reached, at which time a number of limiting factors arise. For electrodialysis to perform efficiently, the solution must contain a sufficient number of ions to maintain adequate conductivity. If the ion concentration (conductivity) becomes too low, the allowable current density gets unreasonably low, conductivity is lost, and separation ceases to take place. Any attempt to force an increase in the current density by increasing operating voltage results in polarization which splits water needlessly, wasting a great deal of energy.

Furthermore, the resulting change in hydrogen ion concentration may change the pH of the solution causing the ions being separated to precipitate, thereby plugging the membrane and rendering the unit useless. To control this problem the current density must be decreased as the concentration of charged ion in the feed solution decreases. As the current density is decreased, decreasing amounts of material are removed from the solution. The only way to compensate for this loss in recovery rate while still maintaining low current densities is to increase the membrane area. However, by doing this, the concentration of the solution produced will also be lower so that the recovered material may not be at a sufficient concentration to be immediately returned to the plating bath.

Alternatively, Donnan dialysis has a number of disadvantages which limit its use for recovery operations with solutions having higher concentrations of ions. The reasons are related to the mechanism by which Donnan dialysis works. Since the driving force is the concentration gradient between the stripping solution and the feed solution, the greater the concentration difference, the greater the rate of exchange or flux. For instance, if nickel is to be removed from a rinse solution, a potential replacement ion would be hydrogen obtained by using sulphuric acid as the strip solution. The higher the concentration of nickel ion in the feed solution, the higher the concentration of acid needed to increase the hydrogen ion concentration to a level where the net transfer of nickel ions from the feed solution to the strip solution is economically efficient and the higher the total amount of hydrogen ion necessary to replace the higher nickel content in the feed. For instance, to obtain a substantial flow when the concentration of nickel ion in the feed solution is about 250 ppm, a typical concentration suitable for electrodialysis, the stripping solution would probably have to be 2 N sulphuric acid and would require frequent replacement. As such high concentration, the properties of the exchange membranes also tend to break down allowing both anion and water transfer from the feed solution to the strip solution.

SUMMARY OF THE INVENTION

In accordance with the present invention, an apparatus is provided which combines an electrodialysis unit and a Donnan dialysis unit in such a manner that the concentration of charged ions in a solution can be efficiently reduced to low levels. By using the apparatus to purify solutions of charged ions, a large portion of the charged ions can often be reused. A typical use for the apparatus would be for treating the liquid rinse of a metal plating line to recycle a large portion of the charged ions back into the plating bath while producing an effluent which has a low concentration of charged ions.

BRIEF DESCRIPTION OF THE DRAWING

The invention can be described in more detail with the assistance of the accompanying drawing which is a block diagram of a nickel plating process utilizing the apparatus of the present invention.

DESCRIPTION OF THE PREFERRED EMBODIMENT

As shown in the drawing, a nickel plating bath is depicted diagrammatically by block 10. As workpieces are moved from plating bath 10 to first rinse 12, a portion of the nickel sulfate or nickel chloride plating solution is dragged from plating bath 10 to first rinse 12. While the drawing provides for only a single nickel plating bath, it is understood that depending on the process used, plating bath 10 may actually consist of more than one bath, e.g., three baths might be used: dissimilar baths arranged in series so that bath 10 is the last.

As seen in the drawing, an electrodialysis unit 16 is attached to first rinse 12 to remove a substantial portion of the nickel ions carried from plating bath 10 into first rinse 12. Electrodialysis unit 16 may be any of those described in the prior art for such purposes, suitable examples being described in U.S. Pat. Nos. 3,766,049; 3,909,381; or 3,926,759 incorporated by reference above. Such units are well known to those skilled in the art and contain both cation and anion-exchange membranes formed as thin sheets of ion-exchange material, usually reinforced by a synthetic fabric backing to provide the necessary strength. Thickness can vary between one-tenth to almost one millimeter and membrane sheets larger than one meter square are commonly used. While any of the membranes known in the prior art may be employed, preferred resin matrices are styrene or vinylpyridine copolymerized and cross-linked with divinylbenzene with the exchange capacity being imparted by sulfonic acid, or quaternary ammonium or pyridinium groups covalently bonded to the polymeric backbone. In such membranes, 95-99% of any electric current flowing is carried by the mobile counterions.

In the usual configuration for electrodialysis, alternating cation- and anion-selective membranes are arrayed in parallel between two electrodes to form an ED multicell or membrane "stack". Specially designed spacer/gaskets separate the membranes by forming leaktight, flow directing compartments between adjacent membranes, and the whole assembly is held in compression by a pair of end plates and tie-ends or other clamping device. The compartments or cells formed by the spacers are typically 1-1.5 mm thick and direct the solution fed to the cell over the surfaces of the membranes either in a torturous path or sheet flow pattern. The flow path usually contains a plastic screen or supporting baffles to ensure separation of the membranes and induce turbulent flow. A stainless steel sheet is commonly used for the cathode and platinized titanium for the anode. Other necessary equipment such as pumps, power supply, filters and piping is well known to those skilled in the art, but plastic components are preferred wherever possible to avoid corrosion, stray electrical currents and contamination of the process streams.

For nickel plating, plating bath 10 will typically be operating at a nickel concentration of 70 to 90 grams per liter of solution. Depending on the rate at which the solution of plating bath 10 is carried by workpieces into first rinse 12, as much as 500 grams of nickel per hour, i.e. about 6 liters of solution per hour, will be carried from plating bath 10 into first rinse 12. If some means is not provided for removing the ions from first rinse 12, the concentration of nickel ion in frist rinse 12 will rapidly rise. However, by providing electrodialysis unit 16 attached to recirculate first rinse 12, it is possible to hold first rinse 12 at a nickel concentration of about 1 gram per liter, the preferred range being from about 0.5 to about 3 grams per liter of solution. By controlling the current density and rate of flow of solution through electrodialysis unit 16 which for this operation could have a total membrane area of approximately 100 square meters, it is possible to remove about 500 grams of nickel per 8 hour period at a concentration of 70 to 80 grams of nickel per liter. This would allow the solution obtained form electrodialysis unit 16 to be deposited directly back into plating bath 10 to replenish it as needed. Care must be exercised to insure that the concentrations of the solution in plating bath 10 and the solution from electrodialysis unit 16 are close enough that the added solution does not excessively increase the volume of plating bath 10. If for some reason it is not desired to put the recovered nickel solution back into plating bath 10, it may be simply removed for storage or disposal in some other manner.

After the workpiece is removed from first rinse 12 it is moved to a second rinse 14 to further cleanse the plating solution from the workpiece. While second rinse 14 has been shown as a single tank, it may well comprise one or more further rinses. To reduce the concentration of nickel ion in second rinse 14, a Donnan dialysis unit 20 is attached to recirculate the solution of second rinse 14. Attached to the Donnan dialysis unit 20 is a stripping solution container 22 which provides the stripping solution, e.g. a suitably concentrated solution of sulfuric acid, which acts to provide a source of hydrogen ions to replace charged ions, such as nickel, removed from the second rinse solution being recirculated through Donnan dialysis unit 20. The stripping solution is preferably from about 0.5 N to about 5 N, most preferably about 2 N.

Donnan dialysis unit 20 can be any of the Donnan dialysis units described in the prior art, such as the one described in U.S. Pat. No. 3,454,490 issued July 8th, 1969, incorporated by reference above. While that particular patent does not describe the use of such an apparatus with a plating bath, the use of such apparatus in conjunction with plating processes would be apparent to one skilled in the art. For example, a paper given at the AES/EPA Conference on Pollution Control at Orlando, Florida on Feb. 5–7, 1979 which is published in a volume entitled "Second Conference on Advanced Pollution Control for the Metal Finishing Industry," EPA-600/8-79-014, June, 1979, pages 99–105, incorporated herein by reference, describes the use of Donnan dialysis for the removal of nickel from a Watts-type electroplating line. Ion exchange membranes are used in both Donnan dialysis and electrodialysis except that the driving force in Donnan dialysis is a concentration gradient rather than current density. Possible membrane configurations include plate-and-frame which is similar to the electrodialysis stack described above, and tubular or hollow fibre. It should be noted that the article describes the use of Donnan dialysis by itself as an alternative to electrodialysis in treating an electroplating line to recover dissolved ions. Accordingly, the disadvantages discussed above, i.e. diffusion of anions from the feed solution into the stripping solution and/or osmosis of water from the feed solution into the stripping solution and large acid requirements were experienced. By using the present invention wherein Donnan dialysis is applied to a later rinse, after electrodialysis has been used to maintain an earlier rinse at a low nickel concentration, an apparatus is provided wherein each of the two techniques is employed in the concentration range where they are most efficient.

In a situation where second rinse 14 is not a single tank but consists of several tanks, it may be desirable to return the treated solution to a tank positioned at a later point in the treatment line, and then allow the solution to cascade backwards toward plating bath 10 until it reaches second rinse 14 where it is again recycled. In this manner, it is possible to have Donnan dialysis unit 20 maintain more than one rinse at a very low concentration of metal ion. Furthermore, since nickel plating baths typically require additions of acid, such as sulphuric acid, a stripping solution which has become concentrated with nickel ion may be deposited directly back into plating bath 10 along with the dissolved nickel thereby recycling the sulphuric acid without the need for disposal.

Another means of recycling stripping solution is to deposit it into first rinse 12 for further concentration by electrodialysis unit 16. This is a particular advantage when used in conjunction with a bath operated at or close to ambient temperatures, e.g. zinc or acid copper, where little evaporation takes place restricting the volume of concentrated solution which can be returned.

A typical amount of solution to be carried by workpieces from first rinse 12 to second rinse 14 would be about 6 liters per hour. Assuming first rinse 12 is being held at about 1 gram per liter, about 6 grams per hour would be removed from first rinse 12 into second rinse 14. By using a 40 cell pair Donnan dialysis unit, it may be possible to remove 6 grams of nickel per hour into the stripping solution which will eventually reach a concentration of about at least 20 grams of nickel per liter before the concentration gradient is reduced enough to lower the rate of flux below acceptable levels. It is preferred that the ion concentration in second rinse 14 be maintained between about 5 and about 100 ppm of solution. The rate of removal of charged ions is controlled principally by temperature, flow rates for the strip and feed solutions, the membrane thickness and the concentrations of the strip and feed solutions. It would be readily apparent to one skilled in the art how to vary these factors to obtain the desired rate of removal of charged ions. Furthermore, the concentration of the ions in the stripping solution which are used to replace the charged ions in second rinse 14 may be maintained either by periodically replacing a portion of the stripping solution or by employing a batch method whereby the entire stripping solution is replaced from time to time.

While the system has been described with respect to a nickel plating bath, the ions which can be separated in an apparatus according to the present invention are any of those used in metal finishing solutions. Examples of such ions are aluminum, copper, zinc, lead, gold, silver, cadmium, and chromium.

Although the embodiment described above involves a plating line, it is understood that the present invention is not limited to metal finishing processes. Any solution of charged ions may be treated by the process and apparatus described herein. A large number of commercial processes employ solutions of charged ions. Such solutions are present, for instance, in processes used in the pharmaceutical industry, photography, mining and metal recovery, and the textile industry.

Changes and modifications in the specifically described embodiment can be carried out without departing from the scope of the invention which is intended to be limited only by the scope of the following claims.

What is claimed is:

1. A process for treating rinse water from a plating line, said plating line comprising a plating bath, a first rinse bath for rinsing work pieces which have been plated, and a second rinse bath for rinsing said workpieces after removal from said first rinse bath, said process comprising
   (a) treating rinse water from said first rinse bath with an electrodialysis unit to remove charged ions carried from the plating bath to the first rinse bath;
   (b) recirculating the rinse water from the first rinse bath through said electrodialysis unit to maintain the concentration of charged ions in the concentrated solution from said electrodialysis unit substantially equal to the concentration of said charged ions in said plating bath;
   (c) returning said concentrated solution to said plating bath, and
   (d) treating rinse water from said second rinse bath with a Donnan Dialysis unit.

2. A process as claimed in claim 1 wherein said concentrated solution is returned to said plating bath.

3. A process as claimed in claim 1 wherein the concentration of charged ion in said rinse water in said first rinse bath is not allowed to fall below 250 ppm.

4. A process as claimed in claim 1, said rinse water in said second rinse bath containing charged ions carried into said rinse from said first rinse bath by said workpieces, wherein the concentration of charged ion in said rinse water in said second rinse bath is maintained at less that 100 ppm.

5. A process as claimed in claim 1 wherein said plating bath contains a plating ion which is gold or silver.

6. A process as claimed in claim 1 wherein said plating bath contains a plating ion which is copper or nickel.

7. An apparatus for treating rinse water from a plating line, said plating line comprising a plating bath, a first rinse bath for rinsing residual plating bath solution containing charged ions from workpieces which have been plated, and a second rinse bath for rinsing said workpieces after removal from said first rinse bath, said apparatus comprising an electrodialysis unit adapted to be attached to said first rinse bath, and a Donnan Dialysis unit adapted to be attached to said second rinse bath, said electrodialysis unit being capable of producing a concentrated solution of ions at a concentration substantially equal to the concentration of said ions in said plating bath, and means for returning concentrated solution produced by said electrodialysis unit to said plating bath.

8. An apparatus as claimed in claim 7, said Donnan dialysis unit containing a stripping solution, and wherein said apparatus includes means for transferring stripping solution used in said Donnan dialysis unit to said plating bath.

* * * * *